United States Patent [19]
Yatsuk

[11] 3,781,644
[45] Dec. 25, 1973

[54] INDEPENDENTLY CONTROLLED INVERTER WITH UNIVERSAL COMMUTATING CIRCUIT

[76] Inventor: Vladimir Grigorievich Yatsuk, ulitsa Pervomaiskaya 8, kv. 57, Istra Moskovskoi oblasti, U.S.S.R.

[22] Filed: Mar. 23, 1973

[21] Appl. No.: 344,283

[52] U.S. Cl. ................................. 321/45 C, 321/5
[51] Int. Cl. ............................................ H02m 7/52
[58] Field of Search .............................. 321/5, 45 C

[56] References Cited
UNITED STATES PATENTS

| | | | |
|---|---|---|---|
| 3,219,905 | 11/1965 | Davis et al. | 321/45 C |
| 3,340,453 | 9/1967 | Bradley et al. | 321/45 C |
| 3,555,397 | 1/1971 | Frank | 321/45 C |
| 3,612,973 | 10/1971 | Kuniyoshi | 321/45 C X |

*Primary Examiner*—William M. Shoop, Jr.
*Attorney*—Eric H. Waters et al.

[57] ABSTRACT

An independently controlled inverter with a universal commutating circuit, comprising main thyristors in a three-phase bridge connection whose input is coupled to a d.c. supply source, and whose a.c. side is coupled to commutating thyristors also in a three-phase bridge connection, the d.c. side whereof is connected to an additional charge source and to additional thyristors in a single-phase bridge connection, the diagonal of the latter including a commutating capacitor, is characterized, according to the invention, by that the anode group of the additional thyristor single-phase bridge connection is coupled to the cathode group of the commutating thyristor three-phase bridge connection and, via a choke and a diode, to the positive terminal of the additional charge source, while the cathode group of said additional thyristor single-phase bridge connection is coupled to the anode group of said commutating thyristor three-phase bridge connection and to the negative terminal of the additional charge source.

8 Claims, 8 Drawing Figures

INDEPENDENTLY CONTROLLED INVERTER WITH UNIVERSAL COMMUTATING CIRCUIT

The present invention relates to static devices intended to convert a d.c. voltage into an a.c. voltage with controlled amplitude and frequency, and more particularly to an independently controlled inverter with a universal commutating circuit to be used, in particular, for regulating the speed of rotation of asynchronous and synchronous motors.

Known in the art are many embodiments of independently controlled inverters with interphase or two-step commutation, each comprising a group of main thyristors in bridge connection, reactive-current diodes serving to return the reactive load power to the d.c. circuit, as well as commutating means including diodes, capacitors, and additional thyristors.

In the above inverters, the main thyristors produce a three-phase or an n-phase voltage across the load, the reactive-current diodes ensure a reactive power exchange between the load phases and partial return of said power to the d.c. circuit, and the commutating means provide for switching over of the main thyristors according to a preset program.

The prior art independently controlled inverters suffer from disadvantages residing either in a too high installed load of the commutating chokes and capacitors, or too many accessories involved, or a too complicated inverter control system accounted for by the necessity to separate commutating and additional charging actions.

Besides, in many prior art inverters, the presence of reactive-current diodes necessitates the introduction of additional commutating capacitor recharging circuits, which involves a number of undesirable factors, namely:

reduction of the time period required to restore the controlling ability of thyristors, the capacity of the commutating capacitor remaining the same;

increased current load on thyristors and diodes due to the energy accumulating effect of the commutating choke;

necessity to introduce chokes to preclude instantaneous discharge of capacitors.

Independently controlled inverters with a one-way recharge of capacitors suffer from yet another disadvantage which resides in "idle" recharging of the commutating capacitor to prepare the latter for another commutation. This results in increasing losses due to commutation and substantially reducing the maximum possible frequency of the inverter.

The basic object of the invention is to provide an independently controlled inverter with a universal commutating circuit, capable of effecting any mode of operation with a period of conduction of the main thyristors $\lambda = 120$, 150 and 180 electrical degrees.

Another object of the invention is to provide for automatic recharging of the commutating capacitor.

Still another object of the invention is to make the inverter capable of acting as a protective device in case of commutation failures, which simplifies the circuitry of the inverter as a whole and makes the latter more reliable in operation.

Yet another object of the invention is to simplify the means for returning the reactive load power to the mains circuit.

These objects are achieved by that in the proposed independently controlled inverter with a universal commutating circuit, comprising main thyristors in a three-phase bridge connection, the input of the latter being coupled to d.c. supply source and its a.c. side being coupled to commutating thyristors also in a three-phase bridge connection whose d.c. side is coupled to an additional charge source and to additional thyristors in a single-phase bridge connection with a commutating capacitor in its diagonal, the anode group of the additional thyristor single-phase bridge connection is, according to the invention, coupled to the cathode group of the commutating thyristor three-phase bridge connection and, via a choke and a diode, to the positive terminal of the additional charge source, while the cathode group of said additional thyristor single-phase bridge connection is coupled to the anode group of said commutating thyristor three-phase bridge connection and to the negative terminal of the additional charge source.

When use is made of reactive-current diodes inserted between the d.c. supply source and the phases of the inverter load for mutual compensation of reactive power per load phase, it is expedient that a commutating choke be connected between the anode group of the additional thyristor single-phase bridge connection and the cathode group of the commutating thyristor three-phase bridge connection.

This permits of either substantially reducing the inductance of the chokes between the reactive-current diodes and the main thyristors of the inverter, or eliminating these chokes altogether.

To ensure various modes of commutation, it is also advisable to cuple the anode and cathode groups of the commutating thyristor three-phase bridge connection to the negative and positive terminals respectively of the inverter power source, each group via an additional thyristor operating at a triple frequency.

The anode and cathode groups of the commutating thyristors should advisably be connected to the negative and positive terminals respectively of the inverter power source, as well as of the additional charge source, via decoupling diodes.

In this case, reactive-current diodes become unnecessary because in such an arrangement their function will be performed by the commutating thyristors.

Additional thyristors may be connected in parallel opposition with said decoupling diodes coupled to the input terminals of the inverter.

This makes it possible to avoid loading of the main thyristors with commutating current.

To ensure the return of the reactive load power to the a.c. circuit, it is expedient that another slave inverter in a three-phase bridge connection be coupled to the inverter of the present invention, the anode group of which slave inverter being connected to the positive terminal of the additional charge source and, via a choke and a diode, to the anode and cathode groups of the additional thyristor single-phase bridge connection respectively, while the cathode group of the slave inverter is coupled to the cathode and anode groups of said thyristor bridge connections and to the negative terminal of the additional charge source.

The invention will now be described in greater detail with reference to embodiments thereof with specific terms used in the description for the sake of clarity, however it is not intended that the invention be limited to these terms, and it should be borne in mind that each term covers all the equivalent elements operating in a similar fashion and aimed at solving the problems that underlie the present invention.

For a better understanding of the invention, reference is made to the accompanying drawings, wherein.

Figure 7:
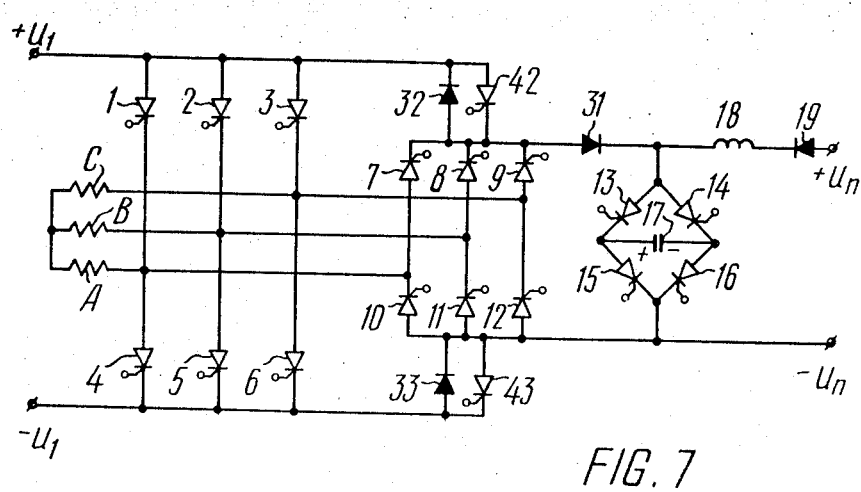
Figure 8:
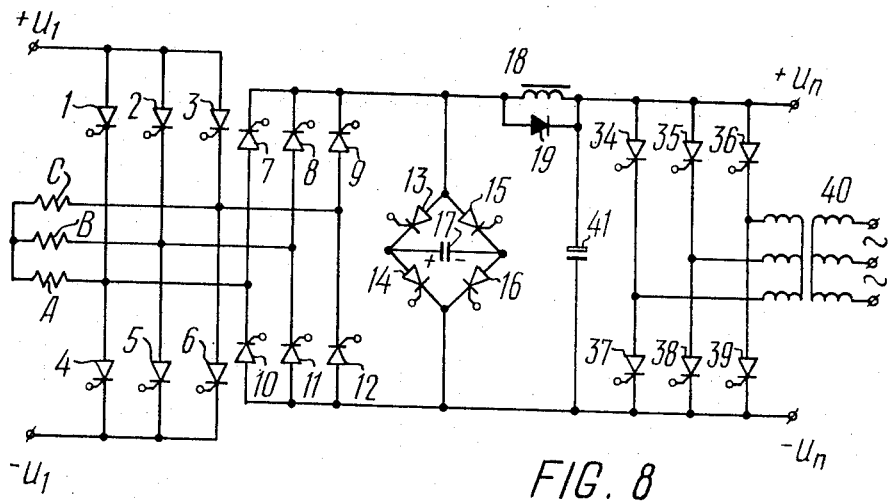

FIG. 7 is a circuit diagram of an independently controlled inverter provided, according to the invention, with additional thyristors connected in parallel opposition with the diodes coupling the anode and cathode groups of the commutating thyristors to the input terminals of the inverter; and FIG. 8 is a circuit diagram of the independently controlled inverter provided, according to the invention, with a slave inverter connected to the anode and cathode groups of the commutating thyristors and to the additional charge source.

Figure 1:
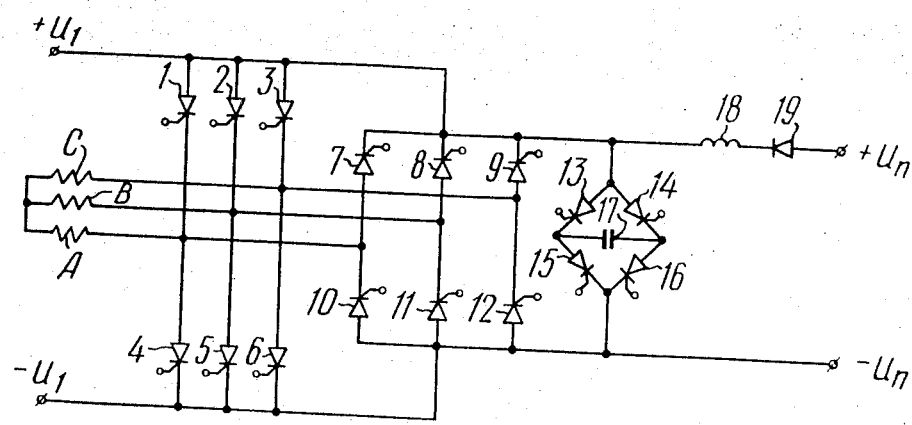
FIG. 1 is a circuit diagram of an independently controlled inverter in its basic embodiment, according to the invention.

Referring now to FIG. 1, the proposed independently controlled inverter comprises, in its basic embodiment, main thyristors 1, 2, 3, 4, 5 and 6 in a three-phase bridge connection whose input is coupled to a d.c. supply source $U_1$, and whose a.c. side is coupled to commutating thyristors 7, 8, 9, 10, 11 and 12, also in a three-phase bridge connection. The anode and cathode groups of the commutating thyristors 7, 8, 9, 10, 11 and 12 are in turn coupled to the cathode and anode groups, respectively, of additional thyristors 13, 14, 15 and 16 in a single-phase bridge connection whose diagonal includes a commutating capacitor 17.

Figure 2:
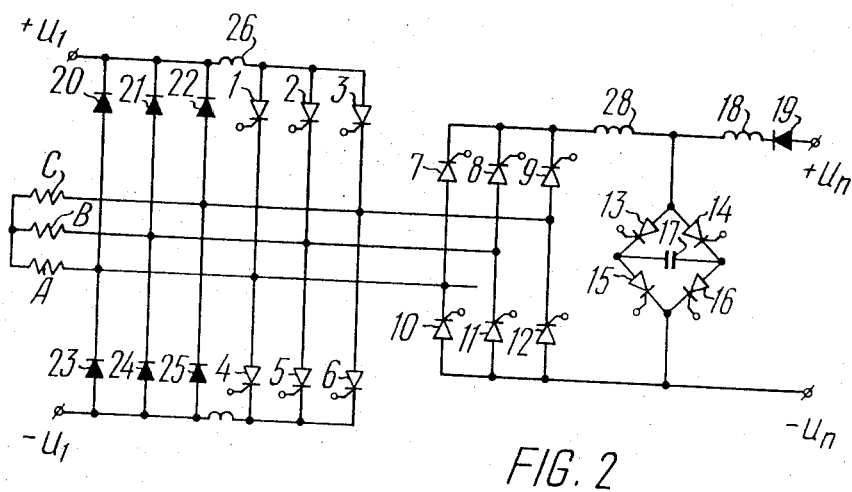
FIG. 2 is a circuit diagram of an independently controlled inverter provided, according to the invention, with reactive-current diodes and an additional commutating choke.

The anode group of said single-phase bridge connection of thyristors 13, 14, 15 and 16 is coupled via a choke 18 and a decoupling diode 19 to the positive terminal of an additional charge source $U_n$, and its cathode group is coupled to the negative terminal of the latter. To mutually compensate the reactive power between the inverter load phases, use is made of reactive-current diodes 20, 21, 22, 23, 24 and 25 (FIG. 2) inserted between the inverter power source $U_1$ and phases A, B and C of the load.

Connected between the reactive-current diodes 20, 21, 22, 23, 24 and 25 and the main thyristors 1, 2, 3, 4, 5 and 6 of the inverter are commutating chokes 26 and 27 precluding an instantaneous discharge of the commutating capacitor 17 during commutation.

To change over from one mode of commutation to another, inserted between the bridge connections of the commutating and additional thyristors may be a commutating choke 28. In this case, the chokes 26 and 27 may be either selected with a low inductance each, or excluded altogether. When two additional thyristors 29 and 30 (FIG. 3) are connected between the anode group of the main thyristors 1, 2 and 3 of the inverter and the cathode group of the commutating thyristors 7, 8 and 9, and, respectively, between the anode group of the commutating thyristors 10, 11 and 12 and the cathode group of the main thyristors 4, 5 and 6, the circuitry of the inverter is capable of ensuring separate, group or common commutation.

Figure 3:
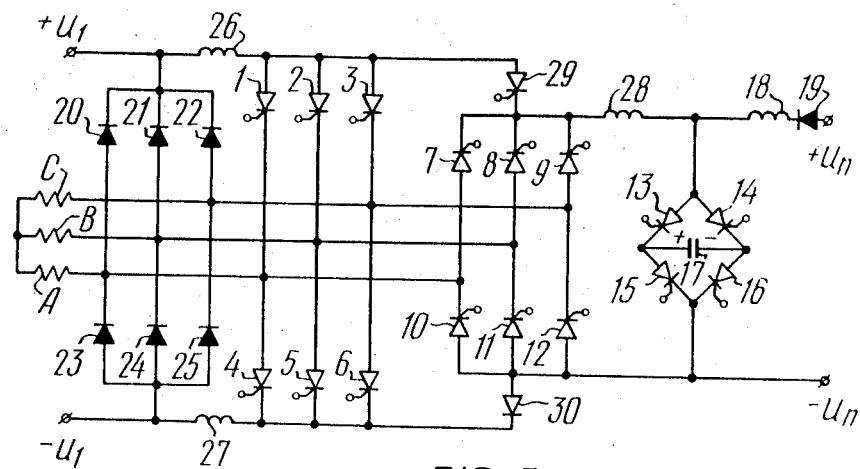
FIG. 3 is a circuit diagram of the independently controlled inverter of FIG. 2 with additional thyristors connected between the commutating thyristors and the input terminals of the inverter.

Consider now the operation of the inverter at a period of conduction of the thyristors equal to 120 electrical degrees. Let us assume that the main thyristors 1 and 6 are turned on, and the load current flows through the phases A and B, while the commutating capacitor 17 is charged with a polarity as shown in FIG. 3.

Figure 4:
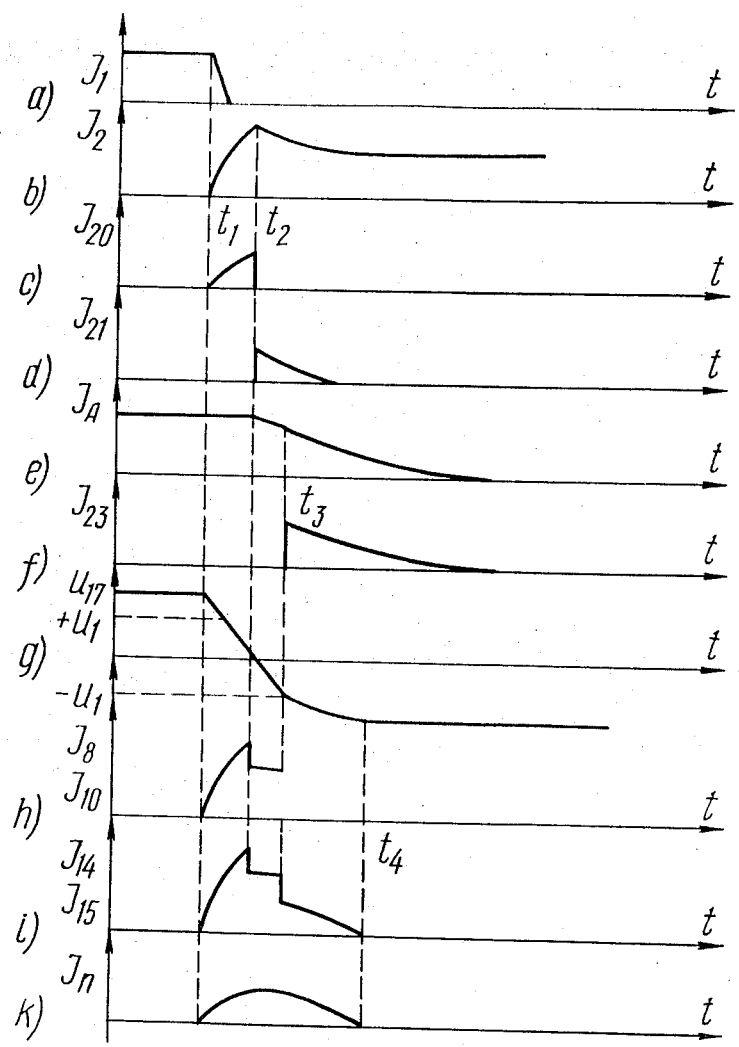
FIG. 4 is a diagram showing the operation of the inverter of FIG. 3.

At a moment of time $t_1$ (FIG. 4), narrow control pulses are applied to the thyristors 2, 3, 10, 14 and 15. Therewith, the commutating capacitor 17 becomes connected between the cathodes of the main thyristors 1 and 2, particularly, with its positive terminal to the cathode of the thyristor 1. The load current is switched over from the thyristor 1 to the thyristor 2 (FIG. 4a, b), and the former is rendered non-conducting.

Recharging of the commutating capacitor 17 is effected following three paths:

1. $+U_1$; choke 26; thyristors 2, 8, 14; commutating capacitor 17; thyristors 15, 10; phase A; phase C; thyristor 6; $-U_1$;
2. commutating capacitor 17; thyristors 15, 10; diode 20; choke 26; thyristors 2, 8, 14 (FIG. 4c);
3. $+U_n$; diode 19; choke 18; thyristor 14; commutating capacitor 17; thyristor 15; $-U_n$ (FIG. 4k).

The third path, however, does not exert any tangible effect upon the discharge time of the commutating capacitor 17 as the characteristic impedance of this path is much greater than that of the other two.

At a moment of time $t_2$, the voltage across the commutating capacitor 17 passes through zero (FIG. 4g) reversing the polarity of the electromotive force of the choke 26. The electromagnetic energy accumulated in the choke 26 is released in the form of heat losses in the thyristor 2, diode 21 and due to the resistance of the conductors (FIG. 4d). At the same time, the second path is eliminated and the commutating capacitor 17 is charged mainly by the load current (FIG. 4h, i).

At a moment of time $t_3$, the voltage across the commutating capacitor 17 becomes equal to that of the power source $U_1$, the first path is eliminated, and the commutating capacitor 17 is additionally charged until the voltage thereacross becomes equal to that of the additional charge source $U_n$. Therewith, the thyristors 8 and 10 are rendered non-conducting, and the reactive current of the phase A passes through the diode 23 (FIG. 4f).

At a moment of time $t_4$, the thyristors 14 and 15 are turned off, and the inverter is ready for a next switching action.

Then, the thyristors 4, 9, 10, 13 and 16 are turned on, and the thyristor 2 is rendered non-conducting.

Thus, during one period of the output voltage, the commutating capacitor 17 effects three full cycles of recharging. To control the thyristors of the above-considered inverter, a simple device is required capable of shaping six trains of narrow pulses shifted by 60 electrical degrees relative to one another.

Simultaneously with each commutation, the capacitor is automatically recharged by the additional charge source $U_n$.

By slightly altering the logic of the control system, the above-considered inverter circuitry can be adapted to a 180 degree conduction period commutation.

Assume that the thyristors 1, 2 and 6 are now conducting. At a moment of time $t_1$, narrow pulses are applied to the thyristors 8, 10, 14 and 15, thus rendering the thyristor 1 nonconducting in a manner described above. Then, a "wide" control pulse is fed with a certain delay to the thyristor 4, whereafter all the above-described operations are repeated.

When two additional thyristors 29 and 30 are introduced (FIG. 3), the inverter can effect separate, group or common commutation.

Let us assume that the thyristors 1, 2 and 6 are turned on.

In the case of separate commutation, to render the thyristor 1 non-conducting, the thyristors 29, 14, 15 and 10 are turned on. To effect group commutation, the thyristors 29, 14, 15, 10, 11 and 12 are turned on for the same purpose. In the case of common commutation, the thyristors 29, 14, 15 and 30 are turned on. The latter mode of commutation can be used for cutting off the inverter under abnormal conditions (commutation failure, break-down of a thyristor and the like).

The introduction of the choke 28 into the circuit made up by the commutating thyristors 7 through 12 and the exclusion therefrom of the chokes 26 and 27 provide for pulsed commutation of the thyristors which eliminates the electromagnetic energy accumulation effect eventual in the commutating circuit.

The presence of the reactive-current diodes 20 through 25 in the above inverter circuitry leads, as has been stated above, to the formation of additional circuits for recharging the commutating capacitor 17 and, consequently to a reduction of the time period required to restore the controlling ability of thyristors. Besides, the presence in the circuitry of the commutating chokes 26 and 27 is essential to preclude an instantaneous discharge of the commutating capacitor 17.

Figure 5:
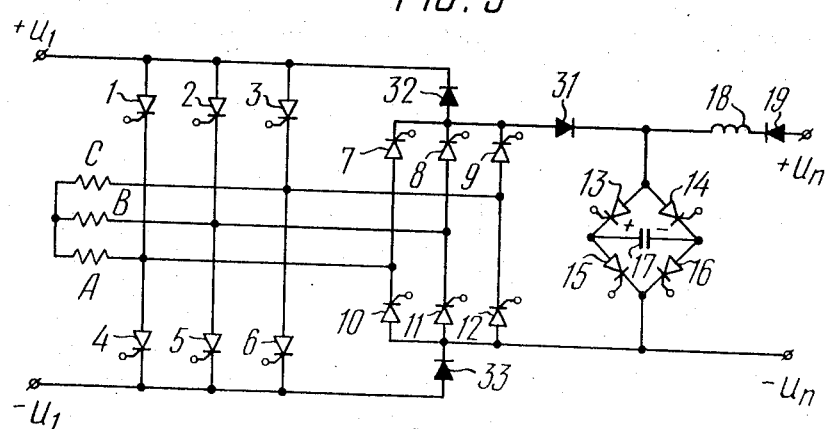
FIG. 5 is a circuit diagram of an independently controlled inverter provided, according to the invention, with additional diodes between the anode and cathode groups of thyristors, and the input terminals of the inverter and the positive terminal of the additional charge source.

The embodiment shown in FIG. 5 is aimed at eliminating this disadvantage, which is attained by making the cummutating thyristors 7 through 12 in the three-phase bridge connection perform the function of reactive-current diodes, the anode and cathode of said thyristors being coupled to the additional charge cource $U_n$ and to the inverter power source $U_1$ via decoupling diodes 31, 32 and 33, and commutating chokes being totally eliminated.

Let us now consider the operation of this embodiment of the independently controlled inverter in greater detail.

Assume that the thyristors 1 and 6 (or 1, 2 and 6) are energized.

Figure 6:
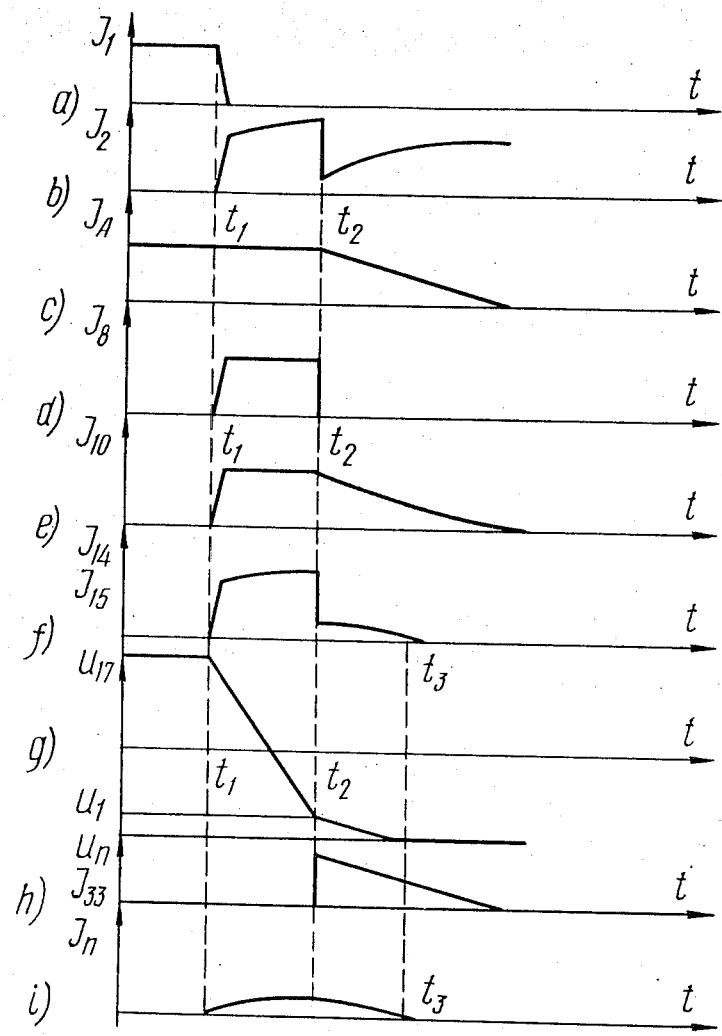
FIG. 6 is a diagram showing the operation of the inverter of FIG. 5.

At a moment of time $t_1$ (FIG. 6), the thyristors 2, 8, 10, 14 and 15 are simultaneously actuated by control pulses from one shaper (not shown). Therewith, the preliminary charged commutating capacitor 17 practically instantaneously switches over the current from the thyristor 1 to the thyristor 2 and the former is rendered non-conducting.

The commutating capacitor 17 is recharged following the paths:

1. $+U_1$; thyristors 2, 8; diode 31; thyristor 14; commutating capacitor 17; thyristors 15, 10; phase A; phase C; thyristor 6; $-U_1$;
2. commutating capacitor 17; thyristors 15, 10; phases A, B; thyristor 8; diode 31; thyristor 14.

As can be seen from FIG. 6g, the commutating capacitor 17 is recharged only by the load current, therefore at the same capacity value, the time period during which the capacitor is fully discharged to zero and, consequently, the time period during which the controlling ability of the thyristors being turned off, is maximum.

The commutating capacitor 17 is recharged proctically according to the linear law, by the load current. At a moment of time $t_2$, the voltage across the commutating capacitor 17 becomes equal, by its absolute value, to that of the power source $U_1$ and the thyristor 8 is rendered non-conducting (FIG. 6d, g). The reactive current of the phase A flows along the following path: phase A, phase C, thyristor 6, diode 33, thyristor 10 (FIG. 6c, e, h). The commutating capacitor 17 is recharged until the voltage thereacross becomes equal to that of the additional charge source $U_n$, via the thyristors 14 and 15 which are automatically turned off at a moment of time $t_3$ (FIG. 6f, i).

During the next switching action, the thyristors 4, 9, 10, 13 and 16 are simultaneously turned on, while the thyristor 6 is turned off. Depending on the logic of the control system, the independently controlled inverter can ensure either a 120 or 180 degree conduction period operation.

Shown in FIG. 7 is an embodiment of the proposed inverter wherein, to ensure separate, group or common commutation, placed in parallel opposition with the additional diodes 32 and 33 are thyristors 42 and 43 operating at a triple frequency in step with the commutation of respective anode or cathode groups of the main thyristors 1 through 6. For example, to turned off the thyristor 1, it is necessary to turn on the thyristors 42, 14, 15 and 10. As for the rest, this embodiment operates in a manner similar to that of the above-described embodiments.

In some applications, independently controlled inverters must possess two-way conduction, i.e. ensure the return of the reactive power to the main circuit.

In the prior art inverters, used for this purpose are either an additional set of a rectifier and a slave inverter or special circuits with complex control logic by means of which the inverter operates in rectifying duty and the rectifier operates in slave inverter duty.

The proposed independently controlled inverter allows for substantially simplifying the means for returning the reactive power to the mains circuit.

Shown in FIG. 8 is an embodiment of the proposed inverter wherein connected to the output terminals of the bridge connection of the thyristors 7 through 12, via the choke 18 and the decoupling diode 19, are thyristors 34, 35, 36, 37, 38 and 39 of the slave inverter by means of which the reactive load power returns via a transformer 40 to the a.c. circuit.

The main feature of this inverter is the use of the additional commutating thyristors 7 through 12 as a reactive power rectifier which permits of substantially reducing the installed capacity of power rectifiers and simplifying the control system.

Consider now the operation of this embodiment.

Let is assume that the main thyristors 1 and 6 are turned on. In this case, the load current flows through the phases A and C. The commutating capacitor 17 is charged with a polarity as shown in FIG. 8. At a particular moment, the thyristor 2 is turned on together with the additional thyristors 8, 10, 14 and 15. Therewith, the positive terminal of the commutating capacitor 17 is coupled to the cathode and its negative terminal is connected to the anode of the thyristor 1, thus rendering the latter non-conducting. The current of the phase A flows along the path: $+U_1$, thyristor 2, thyristor 8, thyristor 15, commutating capacitor 17, thyristor 14, thyristor 10, phase A, phase C, thyristor 6, $-U_1$. At the same time, the commutating capacitor 17 is recharged following the path: $+U_n$, choke 18, thyristor 15, commutating capacitor 17, thyristor 14, $-U_n$. The time constant of this path is determined by the parameters of the commutating capacitor 17 and choke 18 and is selected much greater than the time period required to restore the controlling ability of thyristors.

After the commutating capacitor 17 is recharged so that the voltage thereacross becomes equal to that of the additional charge source $U_n$, the diode 19 is rendered conducting and the reactive current of the phase A flows through a closed circuit: $+U_1$, thyristor 2, thyristor 8, diode 19, slave inverter with thyristors 34 through 39, thyristor 10, phase A, phase C, thyristor 6, $-U_1$.

With load power factors $\cos \phi \leq 0.52$, the reactive current of the phase A partially passes through the phase B as well.

Thus, there is ensured automatic return of the reactive load power to the main circuit via the slave inverter. After the next commutation, the thyristor 6 is turned off and the thyristors 4, 9, 10, 13 and 16 are turned on.

Therewith, the reactive current of the phase C flows through a closed circuit including the commutating thyristors 9 and 10, as well as the slave inverter. A storage capacitor 41 together with the additional charge source $U_n$ serve to stabilize the voltage across the slave inverter, which enables the thyristor control system to be simplified due to the constant firing advance angle.

As the reactive load power increases, the voltage across the capacitor 41 is automatically stepped up, and the recuperated current of the slave inverter increases at a constant angle $\beta$.

Thus, the function of the reverse rectifier in the proposed inverter is automatically performed by the commutating thyristors 7 through 12, while the slave inverter has a simplified control system with a constant firing advance angle. Therewith, the inverter ensures a two-way exchange of energy between the load and the main circuit under any operating conditions.

What is claimed is:

1. An independently controlled inverter with a universal commutating circuit comprising main thyristors in a three-phase bridge connection, the input whereof is coupled to a d.c. supply source; commutating thyristors in a three-phase bridge connection whose a.c. side is coupled to said main thyristor three-phase bridge connection; an additional charge source; additional thyristors in a single-phase bridge connection whose anode group is coupled to the cathode group of said commutating thyristor three-phase bridge connection and, via a choke and a diode, to the positive terminal of said additional charge source, and whose cathode group is coupled to the anode group of said commutating thyristor three-phase bridge connection and to the negative terminal of said additional charge source; a commutating capacitor in the diagonal of said additional thyristor single-phase bridge connection.

2. An independently controlled inverter as claimed in Claim 1, also comprising reactive-current diodes intended to mutually compensate the reactive power between the phases of the inverter load, which diodes are in a three-phase bridge connection arranged between said d.c. supply source and the inverter load phases; commutating chokes connected between said reactive-current diode and main thyristor bridge connections; an additional commutating choke inserted between the anode group of said additional thyristor single-phase bridge connection and the cathode group of said commutating thyristor three-phase bridge connection.

3. An independently controlled inverter as claimed in claim 1, also comprising reactive-current diodes intended to mutually compensate the reactive power between the phases of the inverter load, which diodes are in a bridge connection arranged between said d.c. supply source and the inverter load phases; a commutating choke inserted between the anode group of said additional thyristor single-phase bridge connection and the cathode group of said commutating thyristor three-phase bridge connection.

4. An independently controlled inverter as claimed in claim 1, also comprising additional thyristors operating at a triple frequency, one additional thyristor being inserted between the anode group of said commutating thyristor three-phase bridge connection and the negative terminal of the inverter power source, and the other additional thyristor being inserted between the cathode group of said commutating thyristor three-phase bridge connection and the positive terminal of said inverter power source.

5. An independently controlled inverter as claimed in claim 2, also comprising additional thyristors operating at a triple frequency, one additional thyristor being inserted between the anode group of said commutating thyristor three-phase bridge connection and the negative terminal of the inverter power source, and the other additional thyristor being inserted between the cathode group of aid commutating thyristor three-phase bridge connection and the positive terminal of said inverter power source.

6. An independently controlled inverter as claimed in Claim 1, also comprising decoupling diodes intended to make said commutating thyristors perform the function of reactive-current diodes for which purpose the anode and cathode groups of said commutating thyristors are coupled to the negative and positive terminals respectively of said d.c. supply source and additional charge source, via said desoupling diodes.

7. An independently controlled inverter as claimed in claim 5, also comprising additional thryistors placed in parallel opposition with said decoupling diodes arranged between the anode and cathode groups of said commutating thyristors and the inverter power source terminals.

8. An independently controlled inverter as claimed in claim 1, also comprising an additional inverter ensuring the return of the reactive load power to the main circuit, which additional inverter is in a three-phase bridge connection whole anode group is coupled to the positive terminal of said additional charge source and, via said choke and diode, to the anode and cathode groups respectively of said additional thyristor single-phase bridge connection and commutating thyristor three-phase bridge connection, and whose cathode group is coupled to the cathode and anode groups of said thyristor bridge connections and to the negative terminal of said additional charge source.

* * * * *